United States Patent
Fukui et al.

(10) Patent No.: US 6,466,685 B1
(45) Date of Patent: Oct. 15, 2002

(54) PATTERN RECOGNITION APPARATUS AND METHOD

(75) Inventors: Kazuhiro Fukui, Hyogo-ken; Kaoru Suzuki, Osaka-fu; Osamu Yamaguchi, Hyogo-ken; Kenichi Maeda, Hyogo-ken, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/352,839

(22) Filed: Jul. 13, 1999

(30) Foreign Application Priority Data

Jul. 14, 1998 (JP) .......................................... 10-199128
Aug. 27, 1998 (JP) .......................................... 10-241471

(51) Int. Cl.⁷ .................................................. G06K 9/00
(52) U.S. Cl. ........................ 382/115; 382/117; 382/118
(58) Field of Search ................................ 382/115, 117, 382/118, 155, 156, 158, 159, 160

(56) References Cited

U.S. PATENT DOCUMENTS 5,497,430 A * 3/1996 Sadovnik et al. ........... 382/156
5,642,431 A * 6/1997 Poggio et al. .............. 382/118
5,710,833 A * 1/1998 Moghaddam et al. ....... 382/228
5,870,138 A * 2/1999 Smith et al. ................ 348/143
6,188,777 B1 * 2/2001 Darrell et al. .............. 382/103

OTHER PUBLICATIONS

Moses, Yael et al., "Face Recognition: The Problem of Compensating for Changes in Illumination Direction", Lecture Notes in Computer Science, vol. 800, pp. 286–296. (1994).

* cited by examiner

Primary Examiner—Leo Boudreau
Assistant Examiner—Yosef Kassa
(74) Attorney, Agent, or Firm—Finnegan, Henderson, Farabow, Garrett & Dunner, L.L.P.

(57) ABSTRACT

An image pattern of an object is inputted. An input subspace calculation section calculates an input subspace from the image pattern. A dictionary subspace calculation section calculates a dictionary subspace from a learning pattern of each object. A constraint subspace calculation means calculates a constraint subspace from a plurality of input subspaces previously calculated according to constraints to suppress unnecessary patterns. A projection section projects the input subspace and the dictionary subspace onto the constraint subspace. A recognition section recognizes the object by comparing the projected input subspace with the projected dictionary subspace.

21 Claims, 7 Drawing Sheets

PATTERN RECOGNITION APPARATUS AND METHOD

FIELD OF THE INVENTION

The present invention relates to a pattern recognition apparatus and a method to correctly recognize an image pattern by eliminating unnecessary pattern information from the image pattern.

BACKGROUND OF THE INVENTION

First, as an example of the prior art, pattern recognition for a face image is explained. Recognition of a person using a face image is executed without phisical contact for the user in comparison with discrimination by fingerprint. As a result, the user's psychological burden is small and it is applied to various areas ranging from human interface to security systems. In the prior art, face image discrimination methods are classified into two methods.

As a first method, the position, shape, and size of specific feature points such as the pupil, nostril, and mouth are calculated to generate a feature vector. This feature vector is matched with the dictionary vector of the object person previously registered to calculate a similarity. The object person of the dictionary vector whose similarity is highest is determined to be the person in question. This method is called the "Structure analysis method".

As a second method, the face image is normalized by a geometrical transformation method such as two dimensional affine transformation based on feature points such as the pupil, and/or nostril. This normalized image is compared with each dictionary normalized image previously registered to calculate the similarity. In the same way as the first method, the object person of the dictionary normalized image whose similarity is highest is determined to be the person in question. This method is called the "pattern method". In comparison with the first method, the discrimination ratio of the second method is higher.

The "Subspace method" is representative of the pattern method, which is widely used in character recognition. In this case, the angle between the input vector and each dictionary subspace is calculated as the similarity degree, and a category of the dictionary subspace whose angle is minimum is determined as the category of the input vector. In comparison with the simple relative method, the subspace method includes diffuseness in the dictionary side and a supplemental ability for transformation of the input pattern.

Furthermore, a "mutual subspace method", including higher supplemental ability is well known, which is disclosed in Japanese patent application PH10-66663. The mutual subspace method is explained in detail because of a prerequisite of the present invention. In the mutual subspace method, both the input side and the dictionary side are represented as the subspace, and "$\cos^2 \theta$" of angle "$\theta$" between the input subspace and the dictionary subspace is regarded as the similarity degree. In this case, "$\cos^2 \theta$" is represented as the following equation.

$$\cos^2\theta = \mathop{SUP}_{\substack{u \in P, v \in Q \\ \|u\| \neq 0, \|v\| \neq 0}} \frac{|(u, v)|^2}{\|u\|^2 \|v\|^2} \tag{1}$$

The projection matrix to the input subspace P is represented as p, and the projection matrix to the dictionary subspace Q is represented as Q. In this case, $\cos^2 \theta$ of angle $\theta$ between subspaces P and Q is the eigenvalue of QPQ or PQP.

This eigenvalue problem is replaced by an eigenvalue problem of a small dimension number. Assume that the eigenvector of QPQ is $v \in Q$. $\phi$, $\phi$ is respectively the base vector of subspace P, Q.

$$P = \sum_{m=1}^{M} \langle \phi_m, \phi_m \rangle \tag{2}$$

$$Q = \sum_{n=1}^{N} \langle \phi_n, \phi_n \rangle \tag{3}$$

The eigenvalue problem of QPQ is represented as the following equation.

$$QPQv = \lambda v \tag{4}$$

$$v = \sum_{k=1}^{N} C_k \phi_k \quad (v \in Q) \tag{5}$$

The equation (5) is substituted to the right side of the equation (4).

$$\lambda v = \sum_{k=1}^{N} \phi \lambda C_k \phi_k \tag{6}$$

On the other hand, the equations (2) (3) are substituted to left side of the equation (4).

$$QPQ = \sum_{K=1}^{N}\sum_{i=1}^{N}\sum_{m=1}^{M}\sum_{n=1}^{N} \langle \phi_i, \phi_i \rangle \langle \phi_m, \phi_m \rangle \langle \phi_n, \phi_n \rangle C_k \phi_k \tag{7}$$

The equation (7) is arranged by changing the order of calculation.

$$QPQ = \sum_{K=1}^{N}\sum_{m=1}^{M}\sum_{n=1}^{N} (\phi_k, \phi_m)(\phi_m, \phi_n) C_n \phi_k \tag{8}$$

In the equations (6) (8), the same parameter $\phi$ k is aimed as follows.

$$\lambda Ck = \sum_{m=1}^{M}\sum_{n=1}^{N} (\phi_k, \phi_m)(\phi_m, \phi_n) C_n \tag{9}$$

In this case, assume the following replacement.

$$C^t = (C_1, C_2, \ldots, C_N) \tag{10}$$

$$X = (X_{ij}) \tag{11}$$

$$X_{ij} = \sum_{m=1}^{M} (\phi_i, \phi_m)(\phi_m, \phi_n) \tag{12}$$

The equation (9) is regarded as the eigenvalue problem of matrix X as follows.

$$\lambda c = Xc \tag{13}$$

The maximum eigenvalue of X is represented as "$\cos^2 \theta_1$" of minimum angle $\theta_1$. The second eigenvalue is $\cos^2 \theta_2$ of the angle along perpendicular direction of the maximum angle. In the same way, hereinafter, $\cos^2 \theta_i$ (i=1, ..., N) is calculated in order. The angle $\theta_i$ (i=1, ..., N) is well known as a canonical angle between two subspaces. In the mutual subspace method, the input side is represented as a subspace in the same way as the dictionary side. Therefore, supplemental ability of pattern transformation is very high. The input subspace is calculated by KL expansion for a plurality of input images. Alternatively, by using a simultaneous iterative method, the input subspace is generated from dynamic images in order.

In the face recognition method using images, discrimination ability is often affected by the following changes.

1. Influence of the change of illumination
2. Influence of time (change of hair, beard, wrinkles)

In short, it is important for the face recognition method to solve the above two problems.

(Problem 1)

As for the change of illumination of problem 1, face recognition as a three dimensional object is often affected by the change of illumination in comparison with the character recognition as a two dimensional object. In case outdoor light is irradiated to one side of the face and a shadow or a highlight occurs on the face, it is difficult for the computer to correctly recognize the face image as the person in question.

As mentioned-above, the mutual subspace method includes a high supplemental ability of pattern transformation, but a robust ability to influence the change of illumination is not improved. This is because a constraint is not assigned to the relation between two vectors u, v forming angle $\theta$ calculated by the mutual subspace method. In short, the constraint is not assigned to a difference vector between two vectors u, v. Therefore, if the mutual subspace method is applied for the image including a change of illumination, the difference vector between the two vectors forming a minimum angle $\theta$ includes the change element of the illumination. As for two different persons, the minimum angle between the two different persons is smaller than the true angle. Conversely, as for the same person, the minimum angle between the same person is larger than the true angle. As a result, the same person is often determined to be a different two persons.

(Problem 2)

As for the aging induced change of the problem 2, the discrimination ability decreases in the same way as the problem 1. In this case, because the difference vector includes pattern changes such as wrinkles that emerge over time, the discrimination ability often decreases.

As mentioned-above, the reason for the instability of these changes is that the discrimination is executed for the face image including pattern changes caused by the change of illumination or passage of years. Therefore, it is important to exclude from the image the pattern change elements that are unnecessary for the discrimination.

SUMMARY OF THE INVENTION

It is an object of the present invention to provide a pattern recognition apparatus and a method to correctly recognize the pattern by excluding unnecessary pattern change elements from the image.

According to the present invention, there is provided a pattern recognition apparatus, comprising: an input means for inputting an image pattern of the object to be recognized; an input subspace calculation means for calculating an input subspace from the image pattern; a dictionary subspace calculation means for calculating a dictionary subspace from a learning pattern of each object; a constraint subspace calculation means for calculating a constraint subspace from a plurality of input subspaces previously calculated according to constraints to suppress patterns unnecessary for recognition; a projection means for projecting the input subspace and the dictionary subspace onto the constraint subspace; and a recognition means for recognizing the object by comparing the projected input subspace with the projected dictionary subspace.

Further in accordance with the present invention, there is also provided a pattern recognition method, comprising the steps of: inputting an image pattern of the object to be recognized; calculating an input subspace from the image pattern; calculating a dictionary subspace from a leaning pattern of each object; calculating a constraint subspace from a plurality of input subspaces previously calculated according to constraints to suppress patterns unnecessary for recognition; projecting the input subspace and the dictionary subspace onto the constraint subspace; and recognizing the object by comparing the projected input subspace with the projected dictionary space.

Further in accordance with the present invention, there is also provided a computer readable memory containing computer readable instructions, comprising: an instruction means for causing a computer to input an image pattern of the object to be recognized; an instruction means for causing a computer to calculate an input subspace from the image pattern; an instruction means for causing a computer to calculate a dictionary subspace from a leaning pattern of each object; an instruction means for causing a computer to calculate a constraint subspace from a plurality of input subspaces previously calculated according to constraints to suppress patterns unnecessary for recognition; an instruction means for causing a computer to project the input subspace and the dictionary subspace onto the constraint subspace; and an instruction means for causing a computer to recognize the object by comparing the projected input subspace with the projected dictionary space.

DETAILED DESCRIPTION OF THE PREFERRED EMBODIMENT (Explanation of the Concept of the Constrained Mutual Subspace Method)

Figure 1:
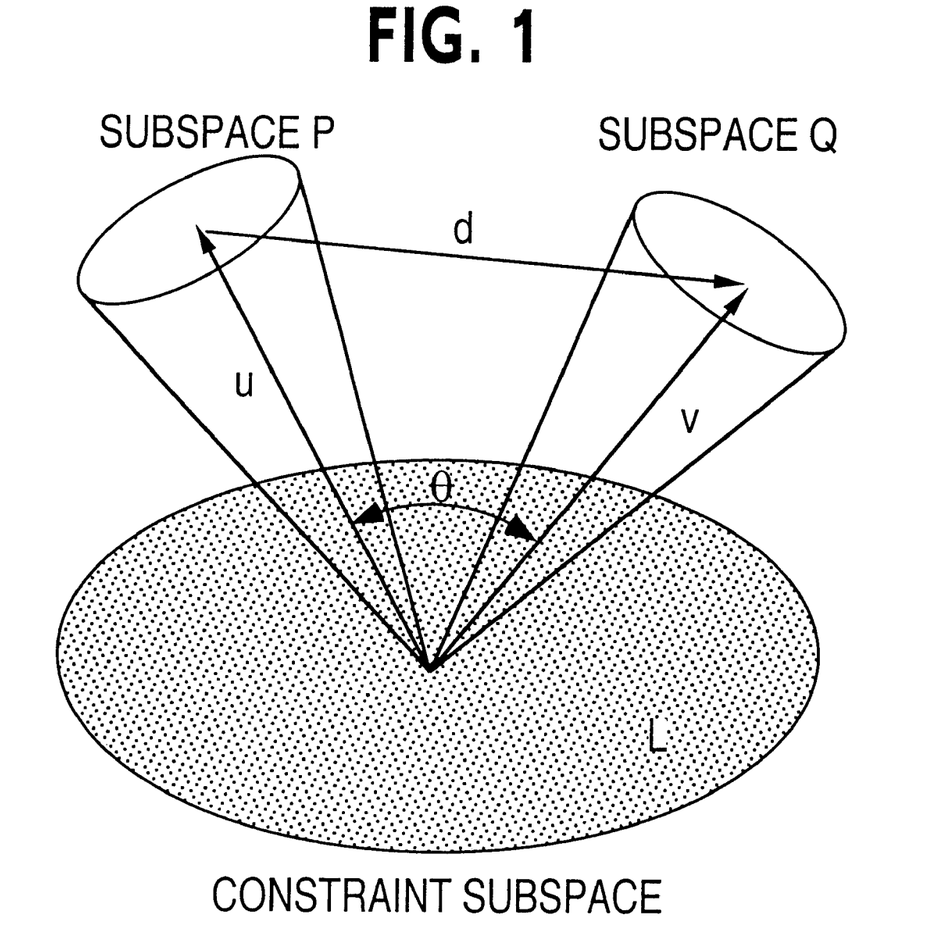
FIG. 1 is a schematic diagram of a constrained mutual subspace method.

In the present invention, unnecessary subspace for recognition is previously excluded from the subspace as an object, and the angle between two subspaces is calculated as the similarity degree. This new method is called the "constrained mutual subspace method". FIG. 1 is a schematic diagram of the constrained mutual subspace method. The constrained mutual subspace method is defined as the following equation.

$$\cos^2\theta = \sup_{\substack{u \in P, \ v \in Q \\ \|Lu\| \neq 0, \ \|Lv\| \neq 0}} \frac{|(Lu, Lv)|^2}{\|Lu\|^2 \|Lv\|^2} \quad (14)$$

In comparison with the equation (1) of mutual subspace method, the equation (14) includes the constraints.

In case the angle between two subspaces is calculated under the constraints, after two subspaces P and Q are projected to the constraint subspace L, the mutual subspace method is applied to two projected subspaces P' and Q'.

(Generation of Constraint Subspace)

The important aspect in the constrained mutual subspace method is how to generate the constraint subspace. In order to realize the constraints suitable for uses, i.e., the constraints to suppress the pattern condition unnecessary for pattern recognition, various kinds of constraint subspace are considered. For example, by adopting the subspace independent to change element of illumination, the change element of illumination included in the difference vector between two vectors u and-v is ignored, and the robust ability of illumination improves. Regarding this kind of the subspace, the "difference subspace" calculated by the difference between two subspaces is explained.

If the mutual subspace method is applied to M-dimensional subspace P and N-dimensional subspace Q, canonical angles $\theta_i$ of n units are calculated (i=1, ..., n, n=min(M, N)). Assume that the difference vector between two vectors $u_i$, $v_i$ forming the canonical angle $\theta_i$ is $d_i$, the subspace defined by the difference vectors d of n units is "difference subspace $D_{PQ}$", the base vector of the subspace P and Q is $\phi$ and $\psi$, and the eigenvector calculated by the equation (13) is $Cu_i$. Two vectors $u_i$, $v_i$ forming the i-th canonical angle $\theta_i$ is defined by the following equation.

$$u_i = \sum_{k=1}^{M} cu_i[k] * \phi[k] \quad (15)$$

Assume the P is replaced by Q and u is replaced by v in equations (4)~(12), and the eigenvector in equation (13) is $cv_i$. The vector $v_i$ is defined as follows.

$$v_i = \sum_{k=1}^{N} cv_i[k] * \phi[k] \quad (16)$$

$$d_i = u_i - v_i \quad \ldots (17)$$

An angle between two vectors $u_1$, $v_1$ is the minimum angle between two subspaces and an angle between two vectors $u_2$, $v_2$ is the second minimum angle along a direction perpendicular to the minimum angle. In the same way, the following vectors ($U_3$~$U_n$, $V_3$~$v_n$) are calculated. The difference vectors $d_i$ of n units (I=1, ~n) are mutually perpendicular. By normalizing the length of each difference vector as "1.0", these normalized difference vectors are regarded as base vectors of the difference subspace.

Figure 2:
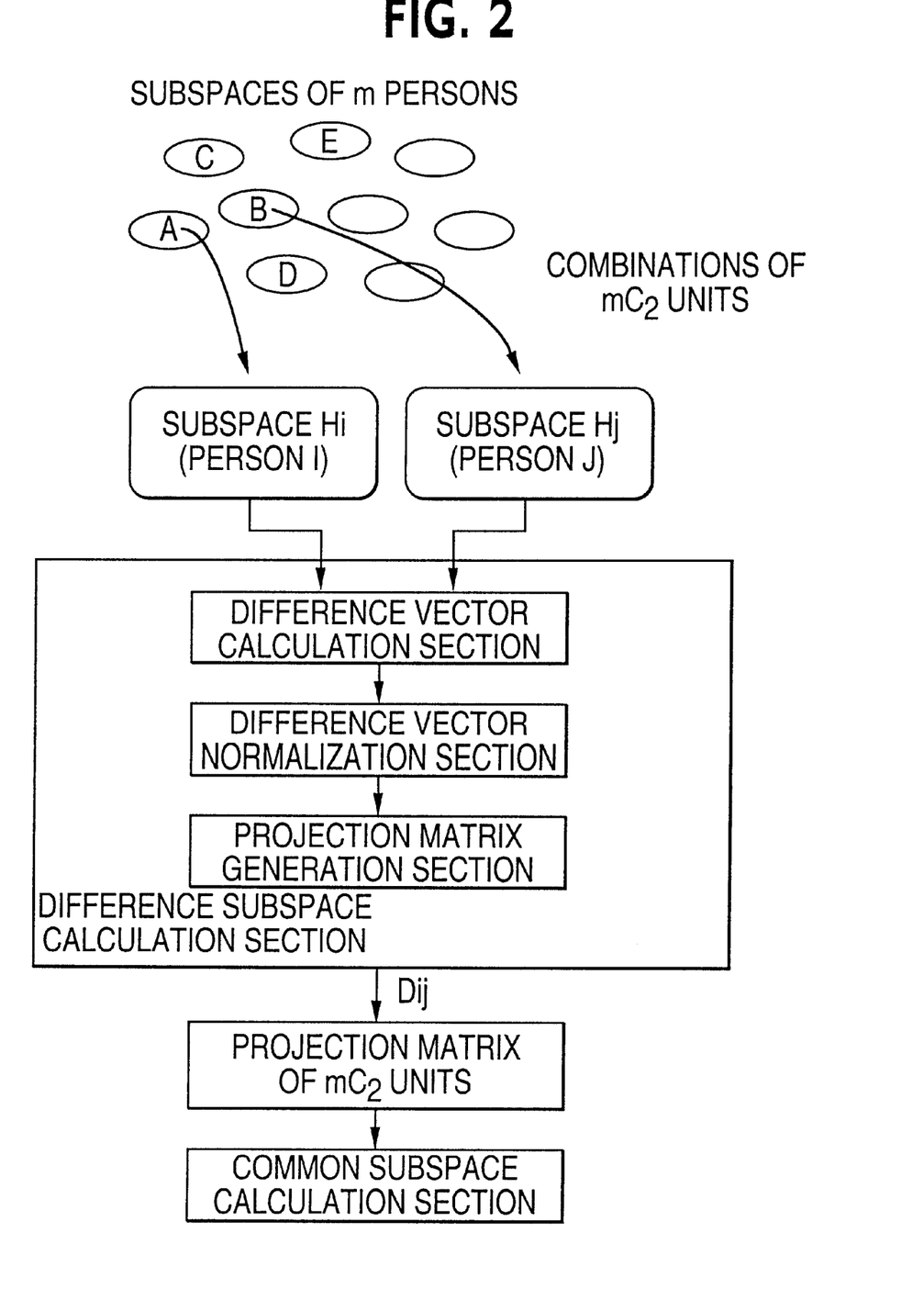
FIG. 2 is a schematic diagram of generation of difference subspace.

FIG. 2 is a schematic diagram of a generation of the difference subspace. In FIG. 2, the difference subspace between two subspaces $H_i$ and $H_j$ of different two persons i and j under a condition of similar illumination is represented as $D_{ij}$. By extracting two subspaces from subspace set of m persons for all pairs, the subspaces of $_mC_2$ units as a total is calculated. A common subspace in all subspaces of $_mC_2$ units is represented as D. Actually, a perfect common subspace does not exist in all subspaces. Therefore, the subspace almost near the common subspace is calculated as follows.

$$D = \bigcap_{\substack{i=1 \sim m, \ j=1 \sim m \\ i \neq j}} D_{ij} \quad (18)$$

Concretely speaking, the difference subspace D is calculated from the set of the subspace of m persons as follows.

1. Projection matrix H corresponding to the subspace H of each person is calculated.
2. By extracting two units from m units in order, the difference subspace $D_{ij}$ of $_mC_2$ units as the total is calculated.
3. The common subspace of the difference subspaces $D_{ij}$ is calculated. So a generation matrix G as an average of projection matrix $D_k$ of w units is calculated as follows.

$$G = \sum_{k=1}^{w} \alpha_k D_k \quad (19)$$

$$\sum_{k=1}^{w} \alpha_k = 1.0 \ (\alpha_k: \text{positive real number}) \quad (20)$$

The eigenvalue of the generation matrix G is distributed in "0.0~1.0". The eigenvector corresponding to "0.0" is a base vector forming a subspace perfectly perpendicular to the common subspace. The eigenvector corresponding to "1.0" is a base vector forming the common subspace. As for the eigenvector corresponding to another eigenvalue, the eigenvalue represents the distance to the common subspace. In this case, the eigenvector whose eigenvalue is larger than "0" is the base vector forming the common subspace D. Furthermore, by changing the parameter α, the weight of each subspace is changed.

The difference subspace does not include the change element of illumination because each pair of two subspaces is generated under a condition of similar illumination. Therefore, if this difference subspace is regarded as the constraint subspace, discrimination without the influence of changing illumination is realized. A change of illumination mainly affects on the cheek or the forehead of the face. By excluding information of these areas, the robust ability for the change of illumination improves. Furthermore, the difference subspace improves the ability to discriminate between similar persons (faces resembling one another) by emphasizing a difference between a particular person and other persons. Pattern information of feature points such as the pupil, mouth, and nostril is important because these feature points represent the difference. Conversely, pattern information such as the cheek or the forehead is ignored because this pattern does not represent the difference.

The difference subspace may be prepared for each person. In this case, the common subspace of each difference subspace between a particular person and other persons is regarded as the particular person's own difference subspace.

For each person, the difference subspace is respectively prepared. The detailed explanation of the subspace is disclosed in Therein, C. W., "Eigenvalue properties of projection operators and their application to the subspace method of feature extraction", IEEE Trans.Cpomute, C-24, p. 944–948, 1975.

(Self Variation Subspace)

Figure 3:
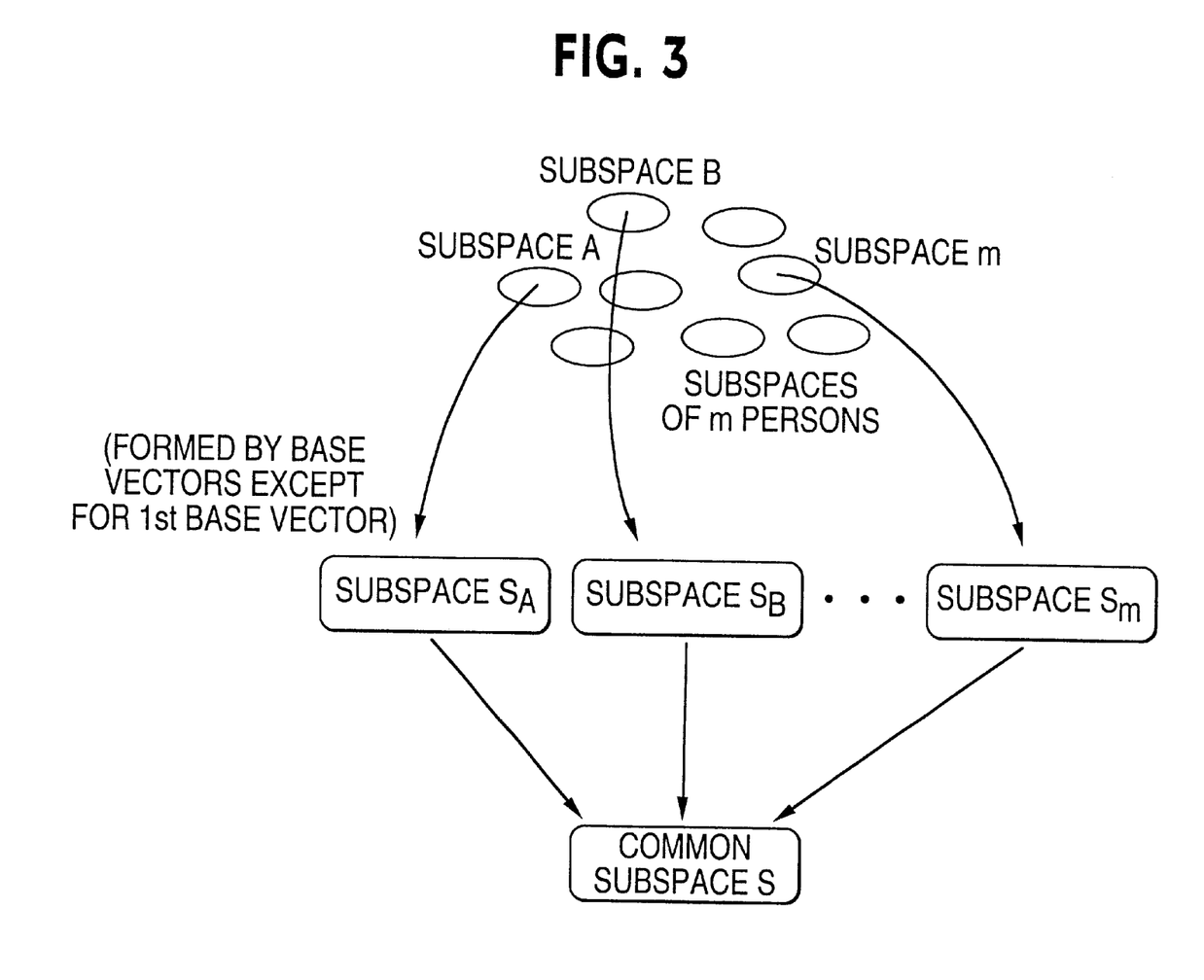
FIG. 3 is a schematic diagram of generation of self variation subspace.

The subspace representing transformation of the same object or person is called "self variation subspace". For example, an object image may vary because of changing illumination or time. FIG. 3 is a schematic diagram of the generation of the self variation subspace. As shown in FIG. 3, the self variation subspace is defined as the common subspace S of each subspace $S_A \sim S_m$. The subspace $S_A \sim S_m$ is formed by the base vectors except for the first vector in the subspace A~m of each person.

(Combination of the Difference Subspace and the Self Variation Subspace)

The correlation between the difference subspace and the self variation subspace is high. If the self variation element is excluded from the difference subspace, the discrimination ability further improves. Therefore, a supplement subspace $S^\perp$ perpendicular to the self variation subspace $S^\perp$ is calculated, and a common subspace for the difference subspace D and the supplement subspace S is calculated as the constraint subspace.

$$L = D \cap S^\perp \quad (21)$$

The projection matrix $s^\perp$ of the supplement subspace $S^\perp$ is calculated as follows.

$$s^\perp = I - s \quad (22)$$

(s: projection matrix of subspace S, I: unit matrix)

The constraint subspace L is formed by the eigenvector corresponding to the eigenvalue larger than "0" in following generation matrix GL.

$$GL = \alpha D + \beta S^\perp \quad (23)$$

$$\alpha + \beta = 1.0 \ (\alpha, \beta: \text{positive real number}) \quad (24)$$

(Face Image Recognition Apparatus)

Figure 4:
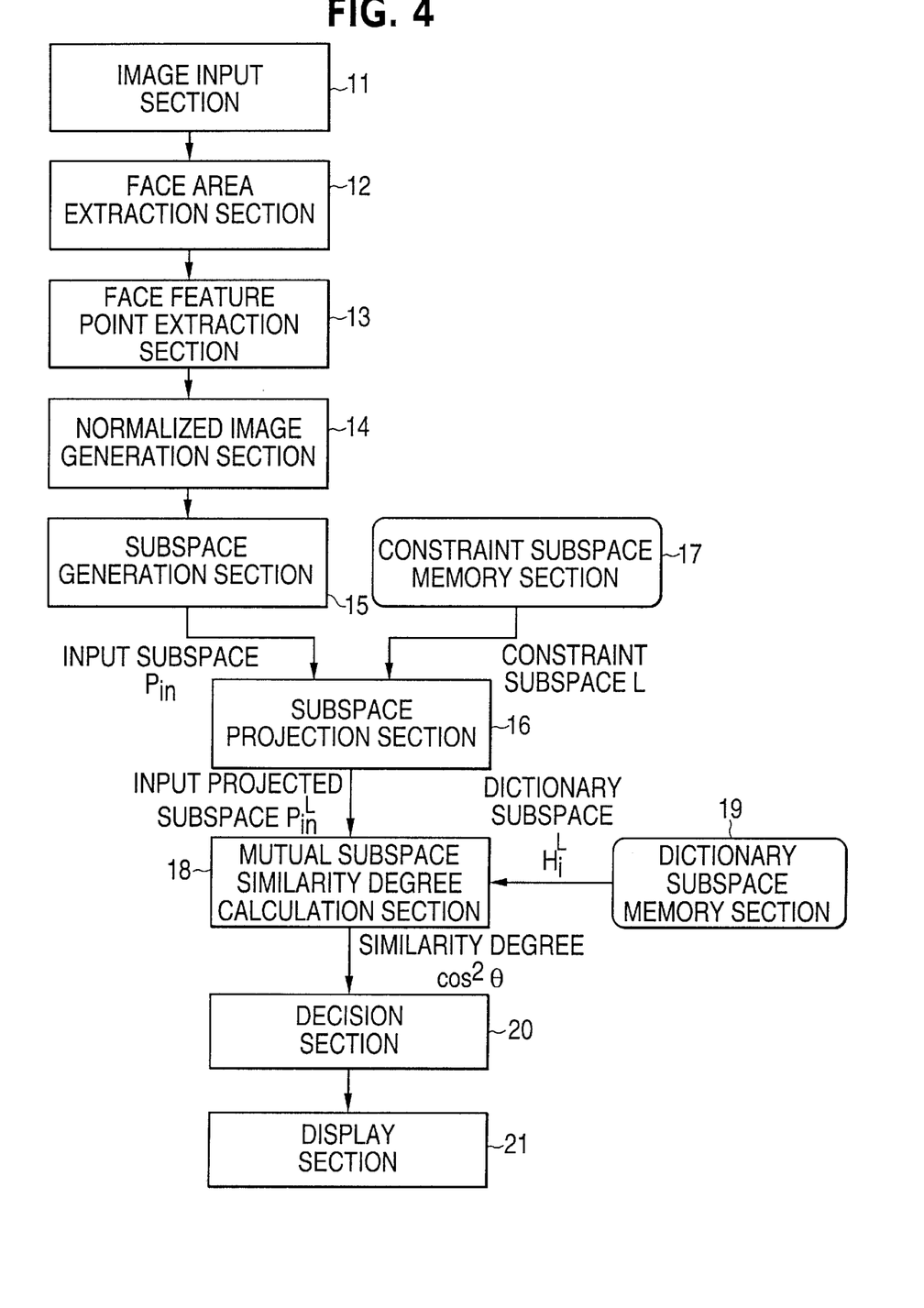
FIG. 4 is a block diagram of the pattern recognition apparatus according to a first embodiment of the present invention.

The present invention can be applied to various kinds of pattern recognition. As a concrete example, a face image as the object for pattern recognition is explained. FIG. 4 is a block diagram of the face image recognition apparatus as a first embodiment of the present invention.

Figure 5:
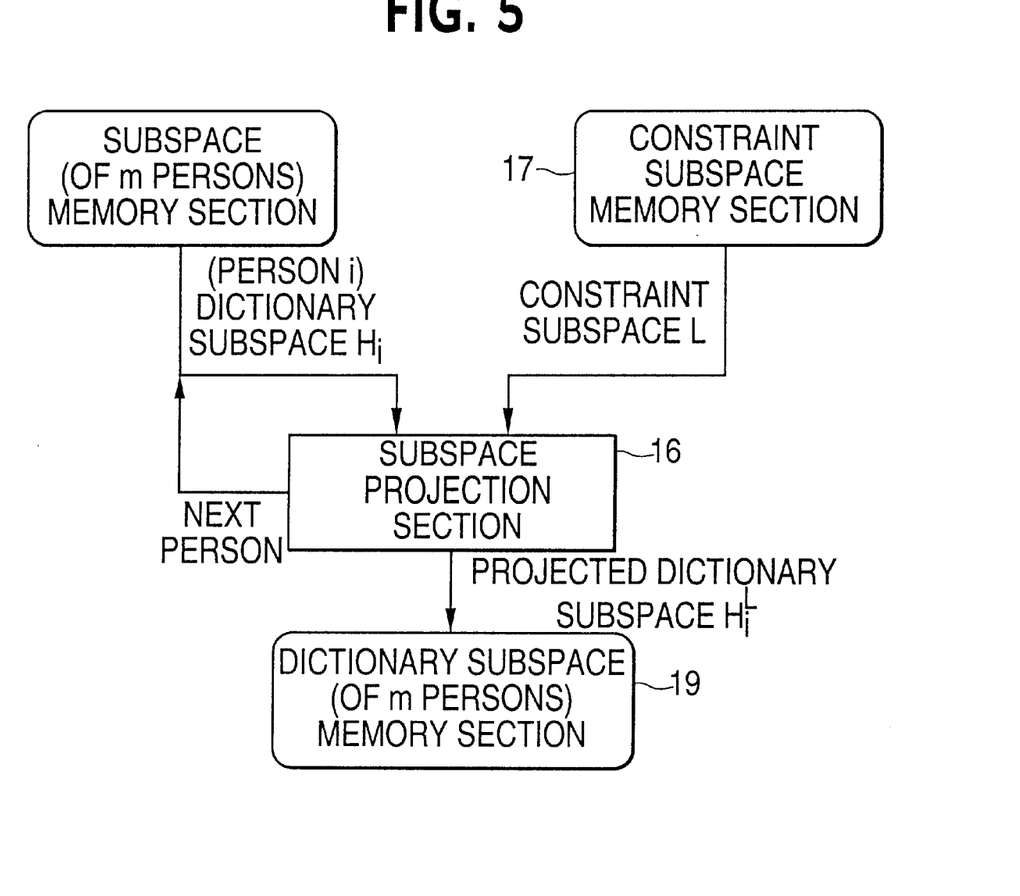
FIG. 5 is a schematic diagram of the generation of dictionary subspace.

The face image recognition apparatus comprises an image input section 11, a face area extraction section 12, a face feature point extraction section 13, a normalized image generation section 14, a subspace generation section 15, a subspace projection section 16, a constraint subspace memory section 17, a mutual subspace similarity degree calculation section 18, a dictionary subspace memory section 19, and a decision section 20, a display section 21. FIG. 5 is a schematic diagram of the generation of dictionary subspace in the dictionary subspace memory section 19. This generation processing is previously executed by off-line.

The image input section 11 such as an ITV camera inputs the face image of the person as the recognition object. The face image from the image input section 11 is digitized by A/D converter (not shown in FIG. 4) and is supplied to the face area extraction section 12. For example, ITV camera is located at the lower part of the monitor or each corner of the monitor.

The face area extraction section 12 continuously extracts the face area from the input image. In this case, by shifting a template (standard face image previously registered) on the image, the correlation value between the template and pixel value of a compared area is calculated. The compared area whose correlation value is highest is decided as the face area. If all correlation values are smaller than the threshold, the face area is determined to be not included in the input image. In order to cope with change of facial direction, a plurality of templates may be used by the subspace method or multiple similarity method. Alternatively, the face area may be stably extracted by color information instead of the plurality of templates.

The face feature point extraction section 13 extracts feature points such as pupils, nostrils, and mouth edges from the face area. In this case, an extraction method using combination of shape information and pattern information is applied. This extraction method is disclosed in Japanese patent application PH8-61463.

As a basic idea of this method, a face candidate of the feature point is selected from a plurality of face candidates by shape information of high accuracy, and the selected candidate is verified by matching with the standard pattern. In this method, the face candidate is correctly selected. In case of selecting the feature point from the face area, this processing is robust for change of intensity of feature point because of the matching by multi-templates. As for processing speed, the face candidate selected by the shape information is only matched with the standard pattern. In comparison with the method for matching all candidates, the calculation quantity greatly reduces. The feature point may be extracted from the face image based on edge information or Eigen feature method. The former method is disclosed in A. L. Yuillc, "Feature extraction from faces using deformable templates", IJCV, vol.8:2, pp. 99–111, 1992. The latter method is disclosed in Alex Pentland, Rahark Moghaddam, Thad Starner, "View-based and modular eigenspaces for face recognition", CVPR 94, PP. 84–91, 1994.

The normalized image generation section 14 normalizes the face image based on the feature point such as pupils and nostrils. For example, a vector linked by both pupils is converted along a horizontal direction, and a vector linked by a midpoint of both nostrils and a midpoint of both pupils are converted along a vertical direction. Then, these two vectors are converted by Affine transformation so that each length is fixed.

The subspace generation section 15 processes the normalized image by a histogram flattening and vector length normalization, and stores this normalized image in memory. When a predetermined number of the normalized images are stored in the memory, the input subspace is generated. In order to generate the subspace in order, a simultaneous iteration method is applied. Therefore, whenever a new normalized image is inputted, the subspace is updated. The generation processing of the input subspace is disclosed in Japanese patent disclosure (Kokai) PH9-251534.

The subspace projection section 16 projects the input subspace Pin generated by the subspace generation section 15 onto the constraint subspace L stored in the constraint subspace memory section 17. In this case, the projected subspace $P^L_{in}$ is calculated by the following steps.

1. The base vectors of m units forming the subspace P are projected onto the constraint subspace.
2. The length of each projected vector is normalized.
3. Gram-Schmitt orthogonalization is executed for the normalized vectors of m units.
4. The orthogonalized vectors of m units are base vectors of projection subspace $P^L_{in}$.

The dimension number of each subspace is experimentally determined according to the kind of data. For example, the dimension number of the difference subspace is 70, the dimension number of the self variation subspace is 20, and the dimension number of the input subspace is 5. The weight parameter is experimentally determined in the same way (for example, α=0.7, β=0.1). As shown in FIG. 5, in case of generating the dictionary subspace, the subspace $H_i$ of each person is projected onto the constraint subspace L stored in the constraint subspace memory section 17. This processing is previously executed by the subspace projection section 16 as off-line. In this way, the dictionary subspace $H^L_i$ of person i is previously stored in the dictionary subspace memory section 19.

The mutual subspace similarity degree calculation section 18 calculates the maximum value of $\cos^2\theta$ between the input subspace $P^L_{in}$ and the dictionary subspace $H^L_i$ of person i stored in the dictionary subspace memory section 19 according to the equation (13). Alternatively, the similarity degree based on a second or third eigenvalue may be calculated. For example, the average of the weighted sum from the first eigenvalue to N-th eigenvalue, or the distribution of the eigenvalues is regarded as the similarity degree. This similarity degree is calculated for m persons registered in the dictionary subspace memory section 19.

If the highest similarity degree in m persons is larger than a threshold, the decision section 20 determines the registered person i corresponding to the highest similarity degree as the person in question of the input face image. In this case, the next highest similarity degree may be used. For example, if a difference between the highest similarity degree and the next highest. similarity degree is smaller than a threshold, the[]person in question of the input face image is not identified.

The display section 21 such as a CRT or speaker outputs the discrimination result on the display or by sound.

(Generation of the Constraint Subspace)

The generation processing of the difference subspace and the self variation subspace is explained.

(1) Generation of the Subspace of Each Person

Under a condition of fixed intensity of illumination, a plurality of face images for m persons are inputted. In this case, it is desirable to have a large number of persons. Furthermore, in case of inputting, each person faces along right and left, top and bottom. As for the normalized face image inputted, after the histogram flattening processing or vector length normalization processing is executed, the base vector forming the subspace is calculated by KL expansion.

(2) Generation of the Difference Subspace

As shown in FIG. 2, two subspaces are extracted from subspaces of m persons and the difference subspace between the two subspaces is calculated. This processing is repeated for combination of $_mC_2$ units of two subspaces. Furthermore, the common subspace in the difference subspaces of $_mC_2$ units is calculated as a formal difference subspace according to the equation (19). Alternatively, the difference subspace may not be calculated from two subspaces of persons i, J, but calculated from the set of differences of the normalized image of persons i, j. In this case, the difference of normalized images between two persons is previously calculated for all combinations of two different persons. KL expansion is applied for the set of differences of normalized images collected in order to calculate the eigenvector. The eigenvector whose eigenvalue is larger than a threshold is the base vector forming the difference subspace.

(3) Generation of the Self Variation Subspace

As shown in FIG. 3, as for each subspace (A, B, . . . , m) of m persons generated at (1), the first base vector is excluded from each subspace. In other words, the subspace formed by the second base vector, . . . , and the final base vector is regarded as the self variation subspace. In FIG. 3, the subspace $S_A$, $S_B$, . . . , $S_m$ is the self variation subspace of each person. The common subspace in the self variation subspace of m units is calculated as a formal self variation subspace.

(4) By using the (formal) difference subspace and the (formal) self variation subspace, the constraint subspace is calculated according to the equations (23) (24).

(Constraint Subspace for Variations Caused by Aging)

The constraint subspace to reduce the influence of variations caused by aging is generated in same way. Assume that subspaces generated at time $t_1$, $t_2$ of person i is $P_i t_1$, $P_i t_2$, the difference subspace between $P_i t_1$, $P_i t_2$ is $D_{t1-t2}$, and an orthogonal subspace for the common subspace of difference subspaces of m persons is invariation subspace $A^\perp$. The invariation subspace includes an effect to exclude unnecessary pattern transformation such as wrinkles that occur over time. In this case, the invariation subspace is added to the constraint subspace. This calculation is represented as the following equation (generation matrix GL) instead of the equations (23) (24).

$$GL = \alpha D + \beta S^\perp + \gamma A^\perp \qquad (25)$$

$$\alpha + \beta + \gamma = 1.0 \qquad (26)$$

(α, β, γ: positive real number)

Figure 6:
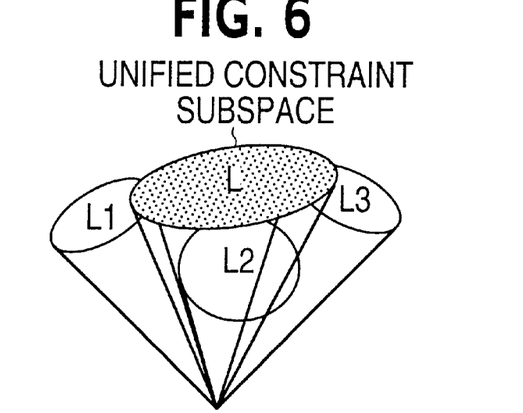
FIG. 6 is a schematic diagram of unification of a plurality of constraint subspace.

FIG. 6 is a schematic diagram of the unification of at least three constraint subspaces. A plurality of (at least three) constraint subspaces are unified by the following equations.

$$G^* = \sum_{i=1}^{n} \alpha_i L_i \qquad (27)$$

$$\sum_{i=1}^{n} \alpha_i = 1.0 \qquad (28)$$

($\alpha_i$: positive real number, $L_i$ (i=1, . . . , n): projection matrix corresponding to the constraint subspace $L_i$)

Next, as the second and third embodiments of the present invention, a method to reduce the influence of illumination changes in the input face image as pre-processing is explained. This processing is executed before the input subspace is generated from the input face image.

Figure 7:
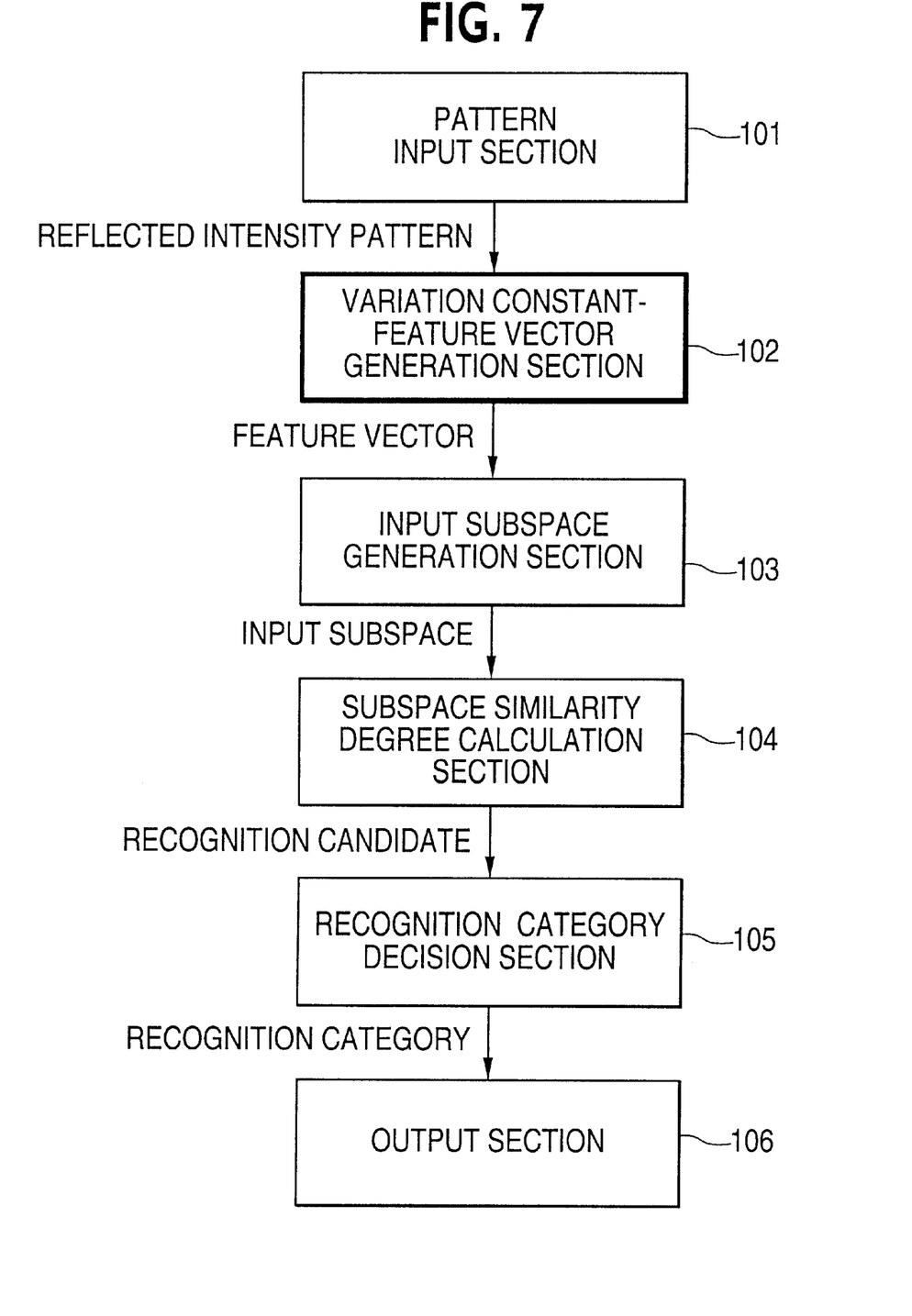
FIG. 7 is a block diagram of the pattern recognition apparatus according to a second embodiment of the present invention.

FIG. 7 is a block diagram of the pattern recognition apparatus according to the second embodiment of the present invention. The pattern recognition apparatus of the second embodiment comprises a pattern input section 101, a variation constant-feature vector generation section 102, an input subspace generation section 103, a subspace similarity degree calculation section 104, a recognition category decision section 105, and an output section 106.

The pattern input section 101 inputs a plurality of face images (reflected intensity pattern of k units) $\{P_1, \ldots, P_k\}$ of the recognition object (person) through a TV camera. In this case, the plurality of images are inputted at different intervals by a TV camera located at a fixed position. Alternatively, by using a TV camera located at a plurality of different positions, the plurality of images may be inputted at one time. The pattern input section 101 may be one TV camera or a plurality of camera means.

In general, the illumination generates a shadow of the object shape on the high reflection part of the image. The change of illumination causes a large change of this shadow on the entire area of the image. Therefore, it is necessary to reduce the large change of the shadow. The variation constant-feature vector generation section 102 includes a function to reduce the large change of the shadow, and generates feature vector $\{V_1, \ldots, V_k\}$ from the reflected intensity pattern $\{P_1, \ldots, P_k\}$ by reducing the influence of the change of illumination. As a method to generate the feature vector from the reflected intensity pattern, the following three methods are selectively used.

(A) High pass filtering (B) Range expansion of low intensity area (C) Fourier transformation (A) As a first method to reduce the influence of change of illumination, the high pass filtering is executed for the reflected intensity pattern $\{P_1, \ldots, P_k\}$ as the input face image. The change of shadow appeared in high reflection part is regarded as a low frequency element. Therefore, by executing the high pass filtering for the reflected intensity pattern $\{P_1, \ldots, P_k\}$, the image pattern is generated as the feature vector $\{V_1, \ldots, V_k\}$ in which the change of the shadow is converted to a small edge. As the simplest method of realization of the high pass filtering, differentiation processing is executed for the reflected intensity pattern $\{P_1, \ldots, P_k\}$. In the differentiation processing, by scanning a differential operator "Op" consisting of (2m+1)×(2n+1) pixels on the image pattern consisting of w×h pixels, the weight coefficient of the pixel in the differential operator "Op" is multiplied by the intensity value of the corresponding pixel on the image pattern. The multiplication is executed for all pixels in the differential operator "Op" and the sum of the multiplication value is regarded as the differential value of center pixel on the corresponding area of the image pattern. The corresponding area covered by the operator "Op" is the neighboring area for the center pixel of the operator on the image pattern. Therefore, the larger the operator size is, the longer the distance from the center pixel to the neighboring pixel on the image pattern referred, i.e., the spacial frequency element including long and low wave length is detected by the operator "Op".

Conversely, in order to detect a high spacial frequency element, the operator is set at a small size. An effective area of differentiation processing by the operator is the area on the image pattern of which m pixels are excluded from the left edge and right edge, and n pixels are excluded from the upper edge and bottom edge. The image pattern after the differentiation processing consists of (w−2m)×(h−2n) pixels, i.e., the feature vector in (w−2m)×(h−2n) dimension. This is because the operator protrudes into the image pattern and the differential value is not calculated if the center pixel of the operator is located outside of the effective area on the image pattern.

As another method of differentiation processing, an embossing processing is used. As the embossing, the image pattern is overlapped on the same image pattern by shifting the pixel position. The pixel value of one side is subtracted from the pixel value of the corresponding position of the other side, and the subtracted value is set as the pixel value of the corresponding position. The embossing is regarded as the differentiation processing along one direction using an extra small operator.

However, the embossing is executed only by the subtraction of pixel values and this calculation time is shorter than the weighted sum calculation of the general differential operator. Especially, embossing by shifting one pixel functions is the high pass filter to extract the highest spacial frequency element from the reflected intensity pattern. Therefore, it is convenient to eliminate the low frequency element of the influence by illumination changes at a low calculation cost. In case of embossing, the effective area is the overlapping area of two similar image patterns, and the feature vector is the vector of the dimension expressed as pixel number of the overlapped area. In the embossing by shifting one pixel, the ineffective area is one pixel width as circumference on the image pattern. Therefore, the effective area is wider than the area used by the differential operator of large size.

As the shift direction of the image pattern in the embossing, it is most effective to shift along a direction perpendicular to the edge direction representing the object feature on the image pattern. In this way, the constant pattern for the change of illumination sufficiently includes the object feature and extremely excludes the influence of the change of illumination. For example, a human face includes horizontal edges such as eyebrows, pupils, and a mouth. Therefore, embossing by shifting the image pattern along the vertical direction of the face is effective. A similar problem for shifting the direction is also applied to the differential operator. It is important to use the differential operator sensitive along the edge direction representing the pattern feature.

The image pattern generated by the high pass filtering includes a strong edge of low reflection area and weak edge of high reflection area. The strong edge is the element to be recognized as the object feature. The weak edge is the noise element whose position and intensity are varied by changes of illumination. Reducing the influence of illumination is accomplished only by the high pass filtering. After the high pass filtering, if a processing to eliminate the remaining noise element is executed for the image pattern, the influence of change of illumination is further reduced. Therefore, as a constant processing for remaining noise elements from the image pattern, minor edge elimination processing is executed.

For example, a pixel value whose absolute value. is below a threshold is replaced by "0" in the image pattern. After this processing, the image pattern includes only strong edges as the feature vector.

(B) As a second method-to reduce the influence of changes of illumination, the range expansion of the low intensity area is executed for the reflected intensity pattern $\{P_1, \ldots, P_k\}$. The change of illumination does not affect the low reflection part. In order to emphasize the image information of the low reflection part (low intensity area) on the reflected intensity pattern, the intensity range of the low intensity area is expanded and the intensity range of the high intensity area is relatively reduced.

In short, gradation of the dark part is enlarged and gradation of the light part is reduced in the image pattern. As a result, information of the high reflection part easily affected by the influence of illumination is reduced as a narrow radiation range, and information of the low reflection part including the object feature is enlarged as a wide radiation range. As a concrete calculation method, by preparing an intensity correction curve defining the output value for input intensity or an intensity correction table storing the output value for the input intensity, the corrected intensity value for the input intensity is determined.

As an extreme example of the expansion processing of the intensity range of the low intensity area, the reflected intensity pattern may be binarized. By comparing the pixel value of the reflected intensity pattern with a threshold, a predetermined value is assigned to the pixel if the pixel value is larger than the threshold, and another predetermined value is assigned to the pixel if the pixel value is not larger that the threshold. In both of the above-mentioned methods, the effective area on the image pattern after processing is not changed. Therefore, the dimension of the feature vector coincides with the number of pixels (w×h) of the input image.

(C) As a third method to reduce the influence of changes of illumination, Fourier transformation for the reflected intensity pattern $\{P_1, \ldots, P_k\}$ is used. The change of shadow by the change of illumination is a low frequency element. Therefore, the effect of the change of illumination appears in the low frequency area of intensity (Fourier spectrum) for each spacial frequency obtained from the reflected intensity pattern $\{P_1, \ldots, P_k\}$ by Fourier expansion. The Fourier spectrum $\{f_1, \ldots, f_n\}$ generated for special frequency of n units for each pattern is regarded as one of N dimensional feature vector $\{V_1, \ldots, V_k\}$. The effect of changes of illumination appears as a small scalar quantity corresponding to the low frequency area. The feature vector generated by Fourier expansion is the Fourier spectrum consisting of a spectrum element of N units. The Fourier spectrum represents the image feature of the object as the pattern of the spacial frequency element. The low frequency element includes the influence of shadow by illumination. The purpose of localizing the change of illumination over the entire area on the low frequency element of the Fourier spectrum is accomplished by Fourier expansion only. In addition to Fourier expansion, the processing to eliminate the remaining low frequency elements is executed. In this case, the change of illumination is further reduced. As this method, the spectrum element of n units as the low frequency element is deleted from the spectrum element of N units. The feature vector is reconstructed by spectrum element to (N−n) units. As a result, the feature vector in which the influence of changes of illumination is eliminated.

(Intensity Correction/Normalization Processing)

Before the change of illumination is reduced by the high pass filtering (A), the range expansion of low intensity area (B), or Fourier transformation (C), the intensity limit or intensity histogram of reflected intensity pattern $\{P_1, \ldots, P_k\}$ is corrected and normalized. In this case, the edge intensity of the differential image, the low intensity area corresponding to low reflection part, and the intensity degree of the Fourier spectrum is reliably calculated irrespective of changes of illumination. As the intensity correction/normalization processing, normed normalization for the reflected intensity pattern (the common coefficient is multiplied with each pixel value so that sum of square of each pixel value is a predetermined value), canonicalation (the common offset is subtracted from each pixel value and the common coefficient is multiplied with the subtracted value so that average of all pixel values is "0" and distribution of all pixel values is "1"), the histogram flattening (each pixel value is corrected as non-linear so that intensity histogram is flat), is selectively used.

(Combination of Feature Quantity)

The method to reduce the influence of changes of illumination is not limited to the above-mentioned (A)~(C). For example, CCCI (Color Constant Color Indexing) description is used. Concretely, the weighted sum of the logarithm of the intensity of each pixel and the logarithm of the intensity of four neighboring pixels is calculated. Even if the illumination changes, the ratio of intensity among multiple pixels in the reflected intensity pattern does not change. Therefore, CCCI description includes the effect of reducing the influence of changes of illumination.

In short, the influence of changes of illumination on the entire area of the image pattern is localized as a very small change. Furthermore, the variation constant-feature vector generation section 102 may generate the feature vector by a combination of the above-mentioned (A)~(C). In short, each scalar quantity of the feature vector generated by method (A)~(C) is suitably combined to generate a new feature vector. For example, each feature vector by the high pass filtering and Fourier transformation may be combined as one feature vector. In this case, the object feature not obtained by one method is used and the stable recognition is executed by localizing the change of illumination in the object feature.

The input subspace generation section 103 extracts eigenvalues $\{\lambda_1, \ldots, \lambda_M\}$ and N-dimensional eigenvector $\{e_1, \ldots, e_M\}$ from N-dimensional feature vector $\{V_1, \ldots, V_k\}$ by principal component analysis such as KL expansion, and extracts the eigenvalue of $M_i$ units ($M_i \leq M$) from the largest eigenvalue in order. In this way, the input subspace $L_i$ (number of dimension: $M_i$) whose base vector is eigenvector $\{e_1, \ldots, e_{Mi}\}$ corresponding to the eigenvalue of $M_i$ units is generated. This "$M_i$" is the number of the base vector of the input side used for calculation of the similarity degree by the subspace similarity degree calculation section 104.

The subspace similarity degree calculation section 104 previously includes a dictionary subspace $\{L_{d1}, \ldots, L_{dx}\}$ corresponding to category of X units as recognition object. The subspace similarity degree calculation section 104 calculates the similarity degree $\{S_1, \ldots, S_x\}$ between the input subspace Li and each dictionary subspace $\{L_{d1}, \ldots, L_{dx}\}$, and outputs the recognition candidate information $\{C_1, \ldots, C_x; S_1, \ldots, S_x\}$ as a pair of the similarity degree and category code $\{C_1, \ldots, C_x\}$. Assume that the projection matrix of the input subspace Li is P, and the projection matrix of the dictionary subspace $L_d$ is Q. The similarity degree S between the input subspace and the dictionary subspace is the maximum eigenvalue of matrix PQP or QPQ. In case of generation of the projection matrix P, the base vector of $M_i$ units in the input subspace $L_i$ is used. In case of generation of the matrix Q, the base vector of X units of the dictionary subspace $L_d$ is used.

The recognition category decision section 105 compares all similarity degrees in the recognition candidate information $\{C_1, \ldots, C_x; S_1, \ldots, S_X\}$, and outputs the category code "$C_o$" whose similarity degree is highest above a threshold as the recognition result. If the category whose similarity degree is above the threshold is not included in the recognition candidate information, the recognition category decision section 105 decides that the recognizable category is not included in the input pattern, and outputs a special code representing no category.

The output section 106 outputs the category code "$C_o$" to the outside of the apparatus as the recognition result.

Figure 8:
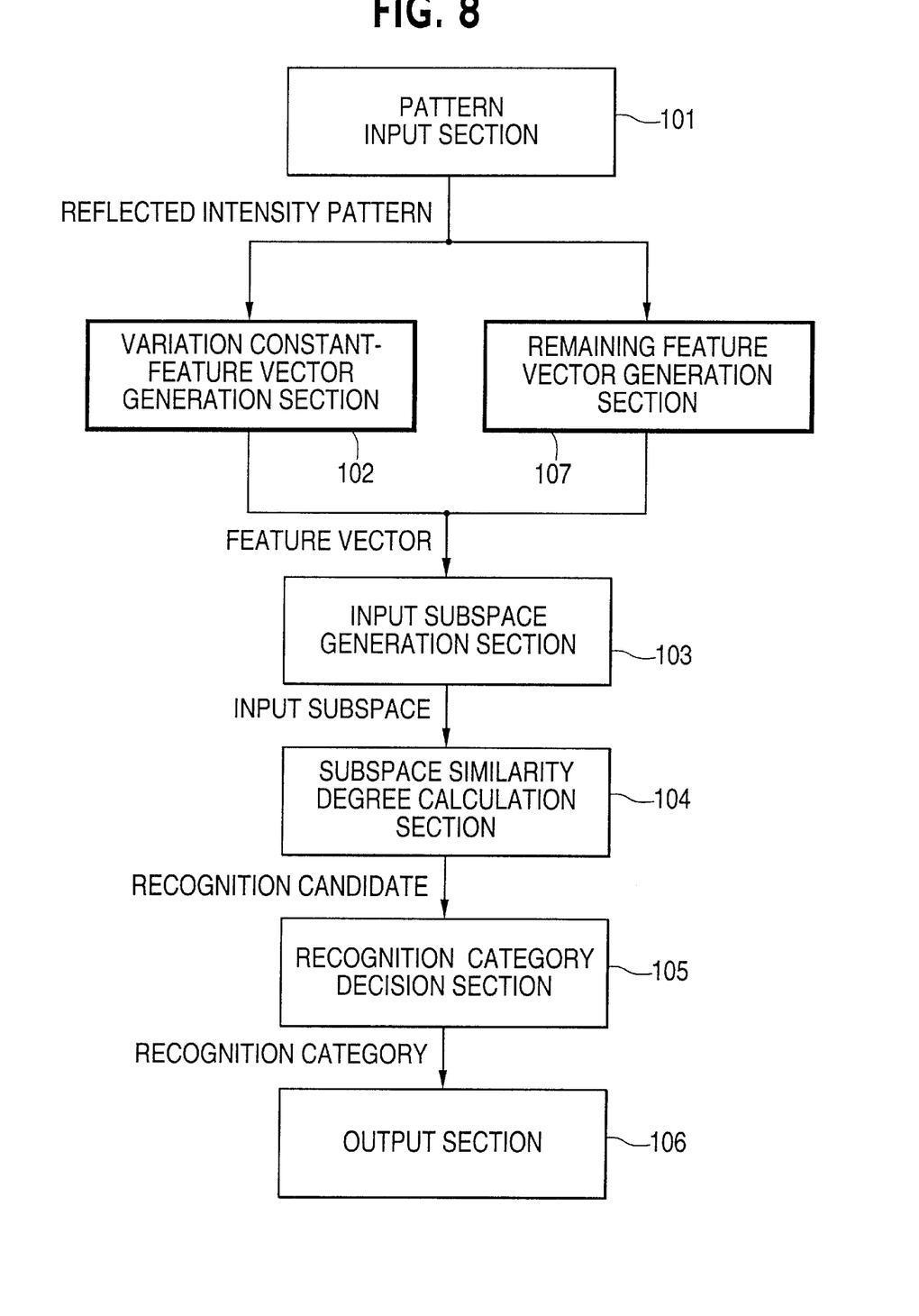
FIG. 8 is a block diagram of the pattern recognition apparatus according to a third embodiment of the present invention.

In the third embodiment, the feature vector whose influence of changes of illumination is reduced and the feature vector whose influence of changes of illumination is not reduced is combined. In short, each scalar quantity of each feature vector is suitably combined to generate a new feature vector. In this case, the object feature information eliminated by the variation constant-feature vector generation section 102 is included in the feature vector whose influence of change of illumination is not reduced. Therefore, in the new feature vector, the influence of changes of illumination is localized while the object feature information remains intact.

FIG. 8 is a block diagram of the pattern recognition apparatus according to the third embodiment of the present invention. The pattern recognition apparatus comprises the pattern input section 101, the variation constant-feature vector generation section 102, the input subspace generation section 103, the subspace similarity degree calculation section 104, the recognition category decision section 105, the output section 106, and a remaining feature vector generation section 107. The remaining feature vector generation section 107 is the only new section in comparison with the second embodiment shown in FIG. 8.

In the same way as in the second embodiment, the variation constant-feature vector generation section 102 generates a first feature vector of N1 dimension from the reflected intensity pattern by the high pass filtering (constant processing of variations of illumination). In this case, the first feature vector is a vector on which the influence of changes of illumination is reduced. In the first feature vector, shadow information representing the shape feature of the object is almost lost and the strong edge representing texture feature of the object is only included. Therefore, the remaining feature vector generation section 107 directly generates a second feature vector of N2 dimension from the reflected intensity pattern without the constant processing of variation of illumination.

The second feature vector is the reflected intensity pattern itself. In the second feature vector, shadow information of the object shape is included and the influence of the change of illumination is also included. The input subspace generation section 103 adds the first feature vector of N1 dimension to the second feature vector of N2 dimension as feature vectors of (N1+N2) dimension, and generates the input subspace from the feature vectors of (N1+N2) dimension.

In the third embodiment, the first feature vector may be generated from the first predetermined area on the input image by the constant processing of variations of illumination, and the second feature vector is generated from the second predetermined area on the input image by other processing. In this case, a lot of the object feature remains while other unnecessary information is eliminated. For example, in case of face recognition, the first predetermined area is the eyebrow, the pupil, the nostril, or the mouth including strong edges,. and the second predetermined area is the forehead or the cheek including solid shape feature. In short, the first predetermined area including many texture feature is executed by the constant processing of variations in illumination, and the second predetermined area including the solid shape feature is not executed by the constant processing of these variations. In this way, while much facial feature information is reserved, the feature vector on which the influence of changes of illuminations is reduced is used.

A memory can be used to store instructions for performing the process described above. The process may be performed with the aid of a general purpose computer or microproccessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A pattern recognition apparatus, comprising:

image input means for inputting a plurality of face images of each of a plurality of people under a condition of similar illumination, each face image of the same person being input at a different time;

input subspace calculation means for respectively calculating at least one subspace of each person from the plurality of face images of each person;

difference subspace calculation means for respectively calculating a difference between two subspaces of two peolpe, and for calculating a common susbspace of all differences of each two people as a difference subspace;

self variation subspace calculation means for respectively calculating a difference between two subspaces of the same person, and for calculating a common subspace of all differences of each person as a self variation subspace;

constraint subspace calculation means for calculating a constraint subspace by subtracting the self variation subspace from the difference subspace;

dictionary subspace memory for storing a plurality of dictionary subspaces each representing a face pattern of a registered person;

projection means for projecting an input subspace and each dictionary subspace onto the constraint subspace, when said image input means inputs a face image of a person in question and said input subspace calculation means calculates the input subspace from the face image; and recognition means for recognizing the person in question by comparing the projected input subspace with each projected dictionary subspace.

2. The pattern recognition apparatus according to claim 1, wherein said recognition means respectively calculates a canonical angle between the projected input subspace and each projected dictionary subspace, and respectively calculates a similarity degree between the projected input subspace and each projected dictionary subspace according to the canonical angle.

3. The pattern recognition apparatus according to claim 2, wherein said recognition means decides the person in question as the registered person of the dictionary pattern of the highest similarity degree.

4. The pattern recognition apparatus according to claim 1, wherein said difference subspace calculation means extracts a principal component subspace from the difference subspace.

5. The pattern recognition apparatus according to claim 4, wherein said self variation subspace calculation means extracts a principal component subspace from all subspaces of each person as the self variation subspace.

6. The pattern recognition apparatus according to claim 5, wherein said constraint subspace calculation means calculates an orthogonal component subspace for the self variation subspace, and calculates the constraint subspace as a sum of the difference subspace and the orthogonal component subspace.

7. The pattern recognition apparatus according to claim 4, wherein said difference subspace calculation means respectively calculates a difference vector between each two subspaces from all subspaces, normalizes each difference vector, and generates a projection matrix from each normalized difference vector.

8. The pattern recognition apparatus according to claim 7, wherein said difference subspace calculation means calculates a generation matrix as an average of each projection matrix, calculates eigenvalues larger than a threshold from the generation matrix, and regards an eigenvector corresponding to the eigenvalues as a base vector of the difference subspace.

9. The pattern recognition apparatus according to claim 1, wherein said input means previously inputs a plurality of face images of each registered person under the condition of similar illumination, and wherein said dictionary subspace calculation means respectively calculates the dictionary subspace from the plurality of face images of each registered person.

10. The pattern recognition apparatus according to claim 1, further comprising feature vector extraction means for reducing an influence of illumination for the image pattern, extracting a feature vector from the image pattern from which the influence of illumination is reduced, and supplying the feature vector to said input subspace calculation means.

11. The pattern recognition apparatus according to claim 10, wherein said feature vector extraction means reduces the influence of illumination for a predetermined area of the image pattern, extracts first feature vector from the predetermined area of the image pattern and second feature vector from other area of the image pattern, and supplies the first feature vector and the second feature vector to said input subspace calculation means.

12. The pattern recognition apparatus according to claim 10, wherein said feature vector extraction means reduces the influence of illumination by high pass filtering.

13. The pattern recognition apparatus according to claim 10, wherein said feature vector extraction means reduces the influence of illumination by a Fourier transform process to determine spectral intensity distribution of spatial frequency component.

14. The pattern recognition apparatus according to claim 10, wherein said feature vector extraction means reduces the influence of illumination by expanding a range of low intensity areas and by relatively compressing a range of high intensity areas.

15. The pattern recognition apparatus according to claim 12, wherein said feature vector extraction means eliminates small edges from the image pattern after the high pass filtering.

16. The pattern recognition apparatus according to claim 13, wherein said feature vector extraction means eliminates low frequency components from the image pattern after the Fourier transform process.

17. The pattern recognition apparatus according to claim 12, wherein the high pass filtering comprises differentiation processing.

18. The pattern recognition apparatus according to claim 17, wherein the differentiation processing comprises embossing processing to derivate edges along a predetermined direction on the image pattern.

19. A pattern recognition method, comprising:

inputting a plurality of face images of each of a plurality of people under a condition of similar illumination, each face image of the same person being input at a different time;

respectively calculating at least one subspace of each person from the plurality of face images of each person;

respectively calculating a difference between two subspaces of two people;

calculating a common subspace of all differences of each two people as a difference subspace;

respectively calculating a difference between two subspaces of the same person;

calculating a common subspace of all differences of each person as a self variation subspace;

calculating a constraint subspace by subtracting the self variation subspace from the difference subspace;

storing a plurality of dictionary subspaces each representing a face pattern of a registered person;

projecting an input subspace and each dictionary subspace onto the constraint subspace, when a face image of a person in question is input and the input subspace is calculated from the face image; and recognizing the person in question by comparing the projected input subspace with each projected dictionary subspace.

20. A computer readable memory containing computer readable instructions, comprising:

instruction means for causing a computer to input a plurality of face images of each of a plurality of people under a condition of similar illumination, each face image of the same person being input at a different time;

instruction means for causing a computer to respectively calculate at least one subspace of each person from the plurality of face images of each person;

instruction means for causing a computer to respectively calculate a difference between two subspaces of two people;

instruction means for causing a computer to calculate a common subspace of all differences of each two people as a difference subspace;

instruction means for causing a computer to respectively calculate a difference between two subspaces of the same person;

instruction means for causing a computer to calculate a common subspace of all differences of each person as a self variation subspace;

instruction means for causing a computer to calculate a constraint subspace by subtracting the self variation subspace from the difference subspace;

instruction means for causing a computer to store a plurality of dictionary subspaces each representing a face pattern of a registered person;

instruction means for causing a computer to project an input subspace and each dictionary subspace onto the constraint subspace, when a face image of a person in question is input and the input subspace is calculated from the face image; and instruction means for causing a computer to recognize the person in question by comparing the projected input subspace with each projected dictionary subspace.

21. A pattern recognition apparatus, comprising:

an image input unit configured to input a plurality of images of each of a plurality of people under a condition of similar illumination, each face image of the same person being input at a different time;

an input subspace calculation unit configured to respectively calculate at least one subspace of each person from the plurality of face images of each person;

a difference subspace calculation unit configured to respectively calculate a difference between two subspaces of two people, and to calculate a common subspace of all differences of each two people as a difference subspace;

a self variation subspace calculation unit configured to respectively calculate a difference between two subspaces of the same person, and to calculate a common subspace of all differences of each person as a self variation subspace;

a constraint subspace calculation unit configured to calculate a constraint subspace by subtracting the self variation subspace from the difference subspace;

a dictionary subspace memory configured to store a plurality of dictionary subspaces each representing a face pattern of a registered person;

a projection unit configured to project an input subspace and each dictionary subspace onto the constraint subspace, when said image input unit inputs a face image of a person in question and said input subspace calculation unit calculates the input subspace from the face image; and a recognition unit configured to recognize the person in question by comparing the projected input subspace with each projected dictionary subspace.

* * * * *